United States Patent [19]

Ise et al.

[11] Patent Number: 4,850,656
[45] Date of Patent: Jul. 25, 1989

[54] ANTI-SLIP CONTROL DEVICE FOR DRIVE WHEELS OF AUTOMOTIVE VEHICLE

[75] Inventors: Kiyotaka Ise, Susono; Sinichi Matsumoto; Hiroharu Miyazaki, both of Toyota, all of Japan

[73] Assignee: Toyota Jidosha Kabushiki Kaisha, Aichi, Japan

[21] Appl. No.: 165,479

[22] Filed: Mar. 8, 1988

[30] Foreign Application Priority Data

Mar. 10, 1987 [JP] Japan .................................. 62-55082

[51] Int. Cl.$^4$ .............................................. B60T 17/00
[52] U.S. Cl. .................................. 303/100; 303/24.1; 303/103; 303/109; 192/1.21; 180/197
[58] Field of Search ................ 303/100, 24.1, 98, 103, 303/107, 108, 109, 110; 180/197; 192/1.21, 1.22, 1.31, 1.32, 1.33, 1.34, 1.35

[56] References Cited

U.S. PATENT DOCUMENTS

| | | | |
|---|---|---|---|
| 3,912,034 | 10/1975 | Pallof | 192/1.22 |
| 4,589,511 | 5/1986 | Leiber | 303/100 |
| 4,685,547 | 8/1987 | Ohashi et al. | 192/1.21 |
| 4,702,336 | 10/1987 | Seibert et al. | 303/103 |
| 4,745,995 | 5/1988 | Wupper | 303/24.1 |
| 4,753,312 | 6/1988 | Burgdorf et al. | 180/197 |

FOREIGN PATENT DOCUMENTS 58-86512 6/1983 Japan .
62-32231 2/1987 Japan .

Primary Examiner—Andres Kashnikow
Assistant Examiner—Matthew C. Graham
Attorney, Agent, or Firm—Oliff & Berridge

[57] ABSTRACT

An anti-slip control device for a drive wheel of a vehicle, for preventing an excessive amount of slip of the drive wheel during acceleration of the vehicle, by lowering a speed of the drive wheel when the amount of slip of the drive wheel exceeds a predetermined value. The control device includes a target-speed determining device for determining a target speed of the drive wheel based on a detected speed of the vehicle and the detected speed of the drive wheel. The control device further includes an uphill-road determining device for determining whether the vehicle is on an uphill road, and a low-speed detecting device for detecting that a detected running speed of the vehicle is lower than a predetermined threshold value. If the vehicle is on an uphill road and the vehicle speed is lower than the threshold value, the target speed determining device is operated in an uphill-road mode such that the determined target speed is lower than that determined in a flat-road mode.

10 Claims, 10 Drawing Sheets

FIG.4

|  | $\alpha_r < G1$ <br> ($-5m/s^2$) | $G1 \leqq \alpha_r < G2$ <br> ($+5m/s^2$) | $G2 \leqq \alpha_r$ |
|---|---|---|---|
| $Vr \geqq V2$ <br> (2km/h) | H <br> (HOLD) | FU <br> (FAST INCREASE) | |
| $V2 > Vr \geqq V1$ <br> (1km/h) | SD <br> (SLOW DECREASE) | | SU <br> (SLOW INCREASE) |
| $V1 > Vr$ | FD <br> (FAST DECREASE) | SD <br> (SLOW DECREASE) | SU <br> (SLOW INCREASE) |

FIG.5

| | $\alpha_r < G1$ <br> ($-3m/s^2$) | $G1 \leq \alpha_r < G2$ <br> ($+10m/s^2$) | $G2 \leq \alpha_r$ |
|---|---|---|---|
| $V_r \geq V2$ <br> (6km/h) | SD <br> (SLOW DECREASE) | SU <br> (SLOW INCREASE) | FU <br> (FAST INCREASE) |
| $V2 > V_r \geq V1$ <br> (3km/h) | FD <br> (FAST DECREASE) | SD <br> (SLOW DECREASE) | |
| $V1 > V_r$ | FD <br> (FAST DECREASE) | | |

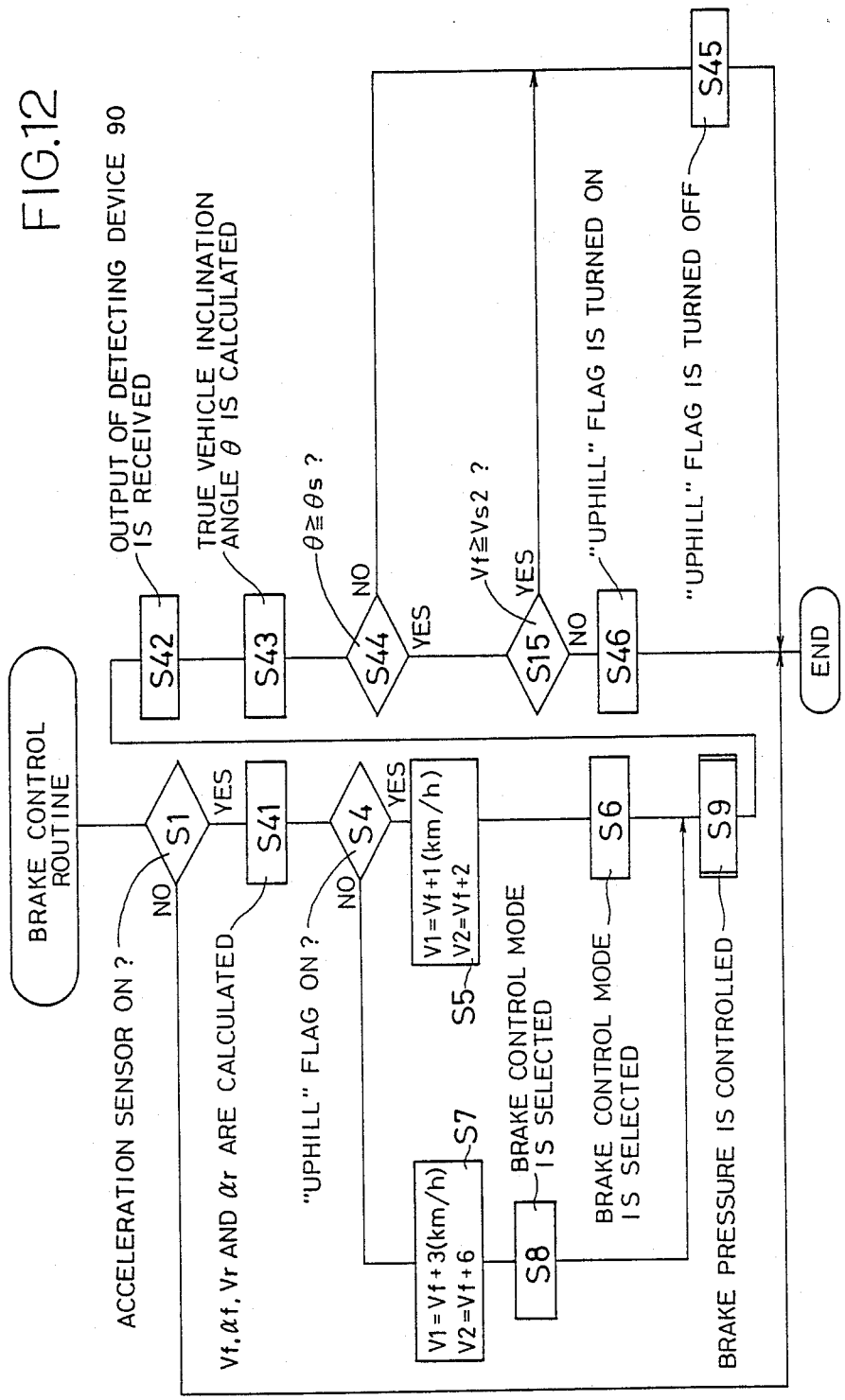

ANTI-SLIP CONTROL DEVICE FOR DRIVE WHEELS OF AUTOMOTIVE VEHICLE

BACKGROUND OF THE INVENTION

1. Field of the Invention

The present invention relates to an anti-slip control device for controlling drive wheels of a motor vehicle during acceleration of the vehicle, particularly upon starting of the vehicle, so as to prevent an excessive amount of slip of the drive wheels.

2. Discussion of the Prior Art

In the case where a drive torque of a drive wheel of a motor vehicle during acceleration of the vehicle is excessively large in relation to a friction coefficient of a road surface, the drive wheel tends to have an excessive amount of slip on the road surface, failing to effectively accelerate the vehicle. Since the drive force that can be produced by the drive wheel is maximum when the slip ratio of the drive wheel is at an optimum value, it is proposed to lower or limit the rotating speed of the drive wheel such that the slip ratio or slip speed of the drive wheel is held at the optimum value. An example of an anti-slip control device for lowering the speed of the drive wheel as indicated above is disclosed in Laid-open Publication No. 62-32231 of Japanese Patent Application No. 60-170301 filed in 1985 in the name of the assignee of the present application. Such an anti-slip control device may use means for reducing an output torque of a drive source of the vehicle, and/or means for applying a brake to the drive wheel, in order to lower the rotating speed of the drive wheel.

Although an anti-slip control device as described above may improve the accelerating capability of the vehicle, a known arrangement of the anti-slip control device may not be completely satisfactory in attaining its function, where the vehicle is started on an uphill road having a low friction coefficient, for example, on a snow-covered uphill road. The vehicle cannot be smoothly started on the uphill road even with the anti-slip control device being properly operated.

SUMMARY OF THE INVENTION

It is accordingly an object of the present invention to provide an anti-slip control device for a drive wheel of a motor vehicle, which permits the vehicle to be smoothly started on an uphill road surface having a comparatively low friction coefficient.

The above object may be achieved according to the principle of the present invention, which provides an anti-slip control device for a drive wheel of a motor vehicle, comprising: (a) vehicle-speed detecting means for detecting a running speed of the vehicle; (b) drive-wheel speed detecting means for detecting a rotating speed of the drive wheel; (c) target-speed determining means for determining a target speed of the drive wheel based on the running speed of the vehicle and the rotating speed of the drive wheel which are detected by the vehicle-speed detecting means and the drive-wheel speed detecting means, respectively; (d) anti-slip control means for lowering the rotating speed of the drive wheel such that the rotating speed substantially coincides with the determined target speed; and (e) uphill-road determining means for determining whether the vehicle is on an uphill road; (f) low-speed detecting means for detecting that the running speed of the vehicle detected by the vehicle-speed detecting means is lower than a first threshold value. The target speed determining means is adapted to determine the target speed in an uphill-road mode such that the determined target speed is lower than that determined in a flat-road mode, if the uphill-road determining means determines that the vehicle is on an uphill road, and if the low-speed detecting means detects that the detected running speed of the vehicle is lower than the first threshold value.

In the anti-slip control device of the present invention constructed as described above, the target speed of the drive wheel is determined to be a comparatively low level while the vehicle is on an uphill road and its speed is extremely low, that is, while the vehicle is being started on an uphill road. In the other conditions, the target speed is determined to be a higher level. Therefore, the slip ratio of the drive wheel is held lower during starting of the vehicle on an uphill road, than in the other cases.

Although it is desirable that the slip ratio of the drive wheel be held below a comparatively low value, for assuring a smooth start of the vehicle on an uphill road having a low friction coefficient, the drivability or accelerating capability of the vehicle is deteriorated if the slip ratio of the drive wheel is limited to such a low value, when the vehicle is running up a slope at a comparatively high speed, or when the vehicle is being started or running on a level road.

According to the present invention, however, the slip ratio of the drive wheel is limited only when the vehicle is started on an uphill road, but is controlled to be a comparatively high value in the other running conditions. Thus, the present anti-slip control device permits a smooth start of the vehicle on an uphill road having a low friction coefficient, and at the same time assures a generally high level of drivability or accelerating capability of the vehicle.

The uphill-road determining means may comprise timing detecting means for detecting a specific point of time during a starting period of the vehicle, and judging means for comparing the running speed of the vehicle detected by the vehicle-speed detecting means, with a second threshold value lower than the first threshold value, when the timing detecting means detects the specific point of time. If the detected running speed of the vehicle is lower than the second threshold value, the judging means determines that the vehicle is on an uphill road. The timing detecting means may be adapted to detect a first point of time when the rotating speed of the drive wheel begins to be lowered by an operation of the anti-slip control device. Alternatively, the timing detecting means is adapted to detect a predetermined time lapse after commencement of an operation of the anti-slip control device.

Alternatively, the uphill-road determining means may comprise: an inclination detecting device for detecting a tentative angle of inclination of the vehicle in a running direction thereof, the tentative angle including a component corresponding to an acceleration of the vehicle in the running direction; acceleration detecting means for detecting the acceleration of the vehicle; means for determining a true angle of inclination of the vehicle, by excluding the component corresponding to the acceleration detected by the acceleration detecting means, from the tentative angle detected by the inclination detecting means; and judging means for determining that the vehicle is on an uphill road, if the determined true angle of inclination is greater than a predetermined value.

The target speed determining means may be adapted to determine the target speed in the flat-road mode by adding a first predetermined value to the running speed of the vehicle detected by the vehicle-speed detecting means, and determine the target speed in the uphill-road mode by adding a second predetermined value to the detected running speed, which second predetermined value is smaller than the first predetermined value.

The anti-slip control means may include a hydraulically operated brake for applying a brake to the drive wheel, and a pressure control device for electrically regulating a brake pressure to be applied to the brake, the pressure control device controlling the brake pressure to a first level if the uphill-road determining means determines that the vehicle is on an uphill road and if the low-speed detecting means detects that the detected running speed of the vehicle is lower than the first threshold value. The pressure control device controls the brake pressure to a second level in other conditions. The first level is higher than the second level. The pressure control means may be adapted to store an uphill-road control table used in the uphill-road mode, and a flat-road control table used in the flat-road mode. Each of the uphill-road control table and the flat-road control table represents a plurality of pressure regulating commands which correspond to a plurality of combinations each of which consists of a corresponding one of different ranges of the rotating speed of the drive wheel and a corresponding one of different ranges of an accleration of the drive wheel. The pressure regulating commands establish corresponding pressure control modes in which the brake pressure is increased or decreased. Each of the pressure regulating commands of the uphill-road table produces the first level which is higher than the second level produced by the corresponding one of the pressure regulating commands of the flat-road table.

The vehicle-speed detecting means may determine the running speed of the vehicle, based on a rotating speed of an idler wheel of the vehicle. The anti-slip control means may comprise means for reducing an output of a drive source to drive the drive wheel.

BRIEF DESCRIPTION OF THE DRAWINGS

The above and optional objects, features and advantages of the present invention will be better understood by reading the following detailed description of presently preferred embodiments of the invention, when considered in connection with the accompanying drawings in which:

FIGS. 4 and 5 are views indicating an uphill-road control table and a flat-road control table which are stored in the ROM and used in the control program of FIG. 3 for regulating a brake pressure to be applied to the drive wheels by the anti-slip control device;

FIG. 12 is a flow chart showing a brake control routine in the embodiment of FIGS. 10 and 11.

DETAILED DESCRIPTION OF THE PREFERRED EMBODIMENTS

Figure 1:
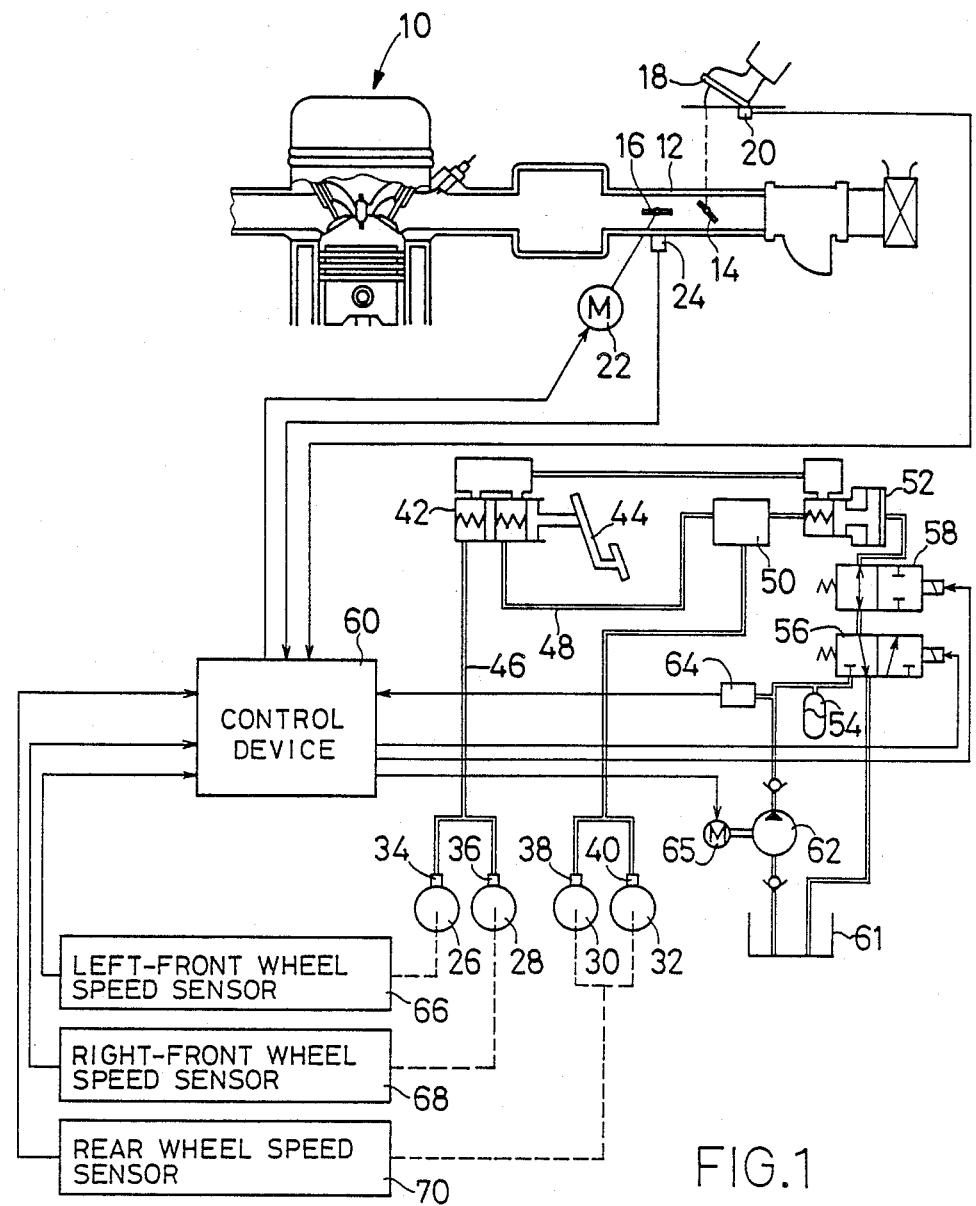
FIG. 1 is a schematic diagram showing an example of an anti-slip control device for drive wheels of a vehicle which incorporates one embodiment of an uphill-road detecting device of the present invention.

Referring first to FIG. 1, there is shown the anti-slip control device according to one embodiment of the invention, for a motor vehicle wherein the front wheels are idler wheels while the rear wheels are drive wheels. The anti-slip control device includes means for reducing an output torque of an engine of the vehicle, as well as a hydraulically operated braking device, in order to lower the rotating speed of the drive wheels, as described below.

In FIG. 1, reference numeral 10 designates the engine of the vehicle equipped with an intake manifold 12 in which a main throttle valve 14 and an auxiliary throttle vale 16 are disposed in series. The output torque of the engine 10 is adjusted by controlling the opening angles of these throttle valves 14, 16. The main throttle valve 14 is adjusted in response to a depressing action on an accelerator pedal 18. The amount of depression of the accelerator pedal 18 is detected by an acceleration sensor 20. The auxiliary throttle valve 16 is operated by an auxiliary throttle control motor 22, and the opening angle of the auxiliary throttle valve 16 is detected by an auxiliary throttle sensor 24

In the lower part of FIG. 1, there are shown left and right front wheels 26, 28, and left and right rear wheels 30, 32. The rear wheels 30, 32 are connected to the engine 10 via a power transmitting mechanism not shown, so that the rear wheels are driven by the engine 10. The front and rear wheels 26, 28, 30, 32 are provided with hydraulically operated wheels brakes 34, 36, 38, 40, respectively, which are operated by fluid pressures supplied from a main master cylinder 42. The main master cylinder 42 has two mutually independent pressure chambers which produce fluid pressures having the same level, when a brake pedal 44 is depressed. The fluid pressure produced in one of the two pressure chambers is applied to the front wheel brakes 34, 36 through a fluid passage 46, while the fluid pressure produced in the other pressure chamber is applied to the rear wheel brakes 38, 40 through a fluid passage 48.

In the fluid passage 48, there is provided a changeover valve 50 to which are connected in parallel the main master cylinder 42 and an auxiliary master cylinder 52. The changeover valve 50 is adapted to feed the rear wheel brakes 38, 40 with a higher one of the fluid pressures produced by the main and auxiliary master cylinders 42, 52.

The auxiliary master cylinder 52 is operated by a fluid supplied from an accumulator 54 via solenoid-operated directional control valve 56 and flow control valve 58. The directional control valve 56 is operated under the control of a control device 60, to effect fluid communication of the auxiliary master cylinder 52 selectively with the accumulator 54 and a reservoir 61, so that the fluid pressure delivered from the auxiliary master cylinder 52 to the rear wheel brakes 38, 40 are increased or decreased. The flow control valve 58 is also controlled by the control device 60, which controls the duty cycle of an electric current to be applied to the solenoid of the valve 58 so that the fluid flow through the valve 58 is changed in two steps, to thereby permit the pressure in the auxiliary master cylinder 52 to be increased or decreased at two different rates. With the flow control valve 58 continuously energized, the pressure in the auxiliary master cylinder 52 is maintained.

The accumulator 54 is adapted to store the pressurized fluid which is pumped from the reservoir 61 by a pump 62. The pressure in the accumulator 54 is detected by a pressure sensor 64 whose output is applied to the control device 60. A pump motor 65 to drive the pump 62 is turned on and off by the control device 60, according to the output of the sensor 64, so that the pressure in the accumulator 54 is maintained within a predetermined range.

Speed sensors 66, 68 are provided to detect the rotating speeds of the left and right front wheels 26, 28, respectively, and a speed sensor 70 is provided to detect the rotating speeds of the left and right rear wheels 30, 32. The speed sensor 70 detects the speeds of the rear wheels 30, 32, based on a rotating speed of an output shaft of a transmission disposed between the engine 10 and the rear wheels 30, 32. These speed sensors 66, 68, 70 are connected to the control device 60.

Figure 2:
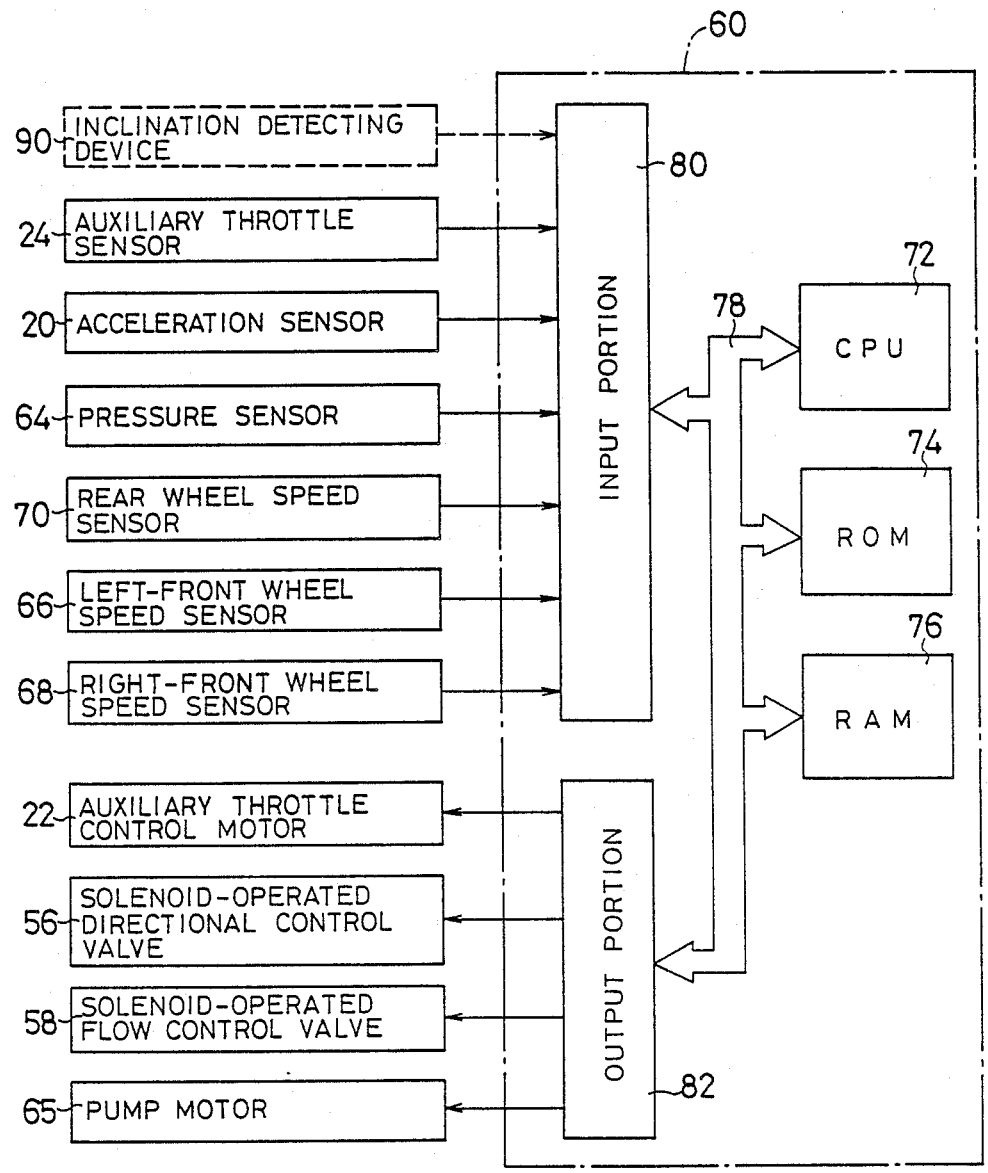
FIG. 2 is a schematic block diagram showing details of a control system of the anti-slip control device of FIG. 1.

Referring next to FIG. 2, the control device 60 is principally constituted by a computer which includes a central processing unit (CPU) 72, a read-only memory (ROM) 74, a random-access memory (RAM) 76, and a data bus 78. The computer receives through its input portion 80 the ouputs of the various sensors 20, 24, 64, 66, 68 and 70 described above, and controls through its output portion 82 the auxiliary throttle control motor 22, solenoid-operated direction and flow control valves 56, 58 and pump motor 65.

Figure 3:
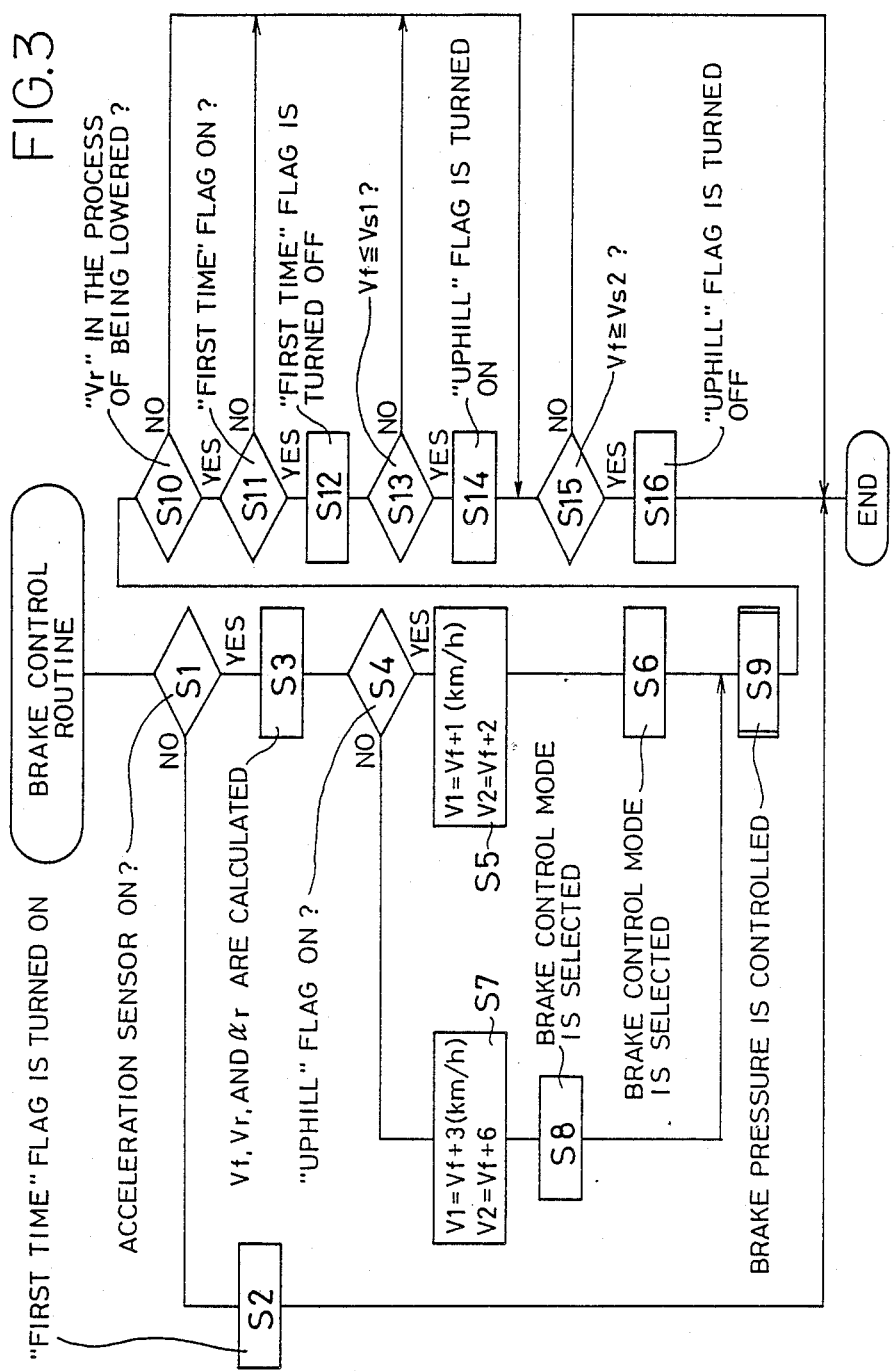
FIG. 3 is a flow chart showing a control program stored in a ROM of the control system of FIG. 2, which is closely associated with the principle of the present invention.

The ROM 74 stores various control programs including a brake control routine shown in FIG. 3, and an uphill-road control table and a flat-road control table which are shown in FIGS. 4 and 5, respectively. As described later in detail, each of these control tables is used to control the fluid pressure in the rear wheel brakes 38, 40 in different control modes depending upon whether the vehicle is started on an uphill road or on a level road.

An example of an anti-slip control operation of the drive wheels 38, 40 by the anti-slip control device constructed as described above is illustrated in the graph of FIG. 6. When the opening $\gamma$ of the main throttle valve 14 is increased by depression of the accelerator pedal 18 as indicated in broken line in the middle of FIG. 6, the running speed Vf of the vehicle (average speed of the front wheels 26, 28) is increased as indicated in the lower part of FIG. 6. At this time, a first reference speed V1 and a second reference speed V2 are determined such that these speeds V1, V2 are higher than the detected running speed Vf by predetermined different values. When the speed Vr of the rear drive wheels 30, 32 exceeds the first reference speed V1, the opening $\beta$ of the auxiliary throttle valve 16 is reduced to lower the output of the engnne 10, so that the speed Vr of the rear wheels substantially coincides with the first reference speed V1. If the speed Vr of the rear drive wheels 30, 32 exceeds the second reference speed V2, a fluid pressure Pr is applied to the rear wheel brakes 38, 40, whereby a brake is applied to the rear wheels 30, 32. In the present embodiment, the auxiliary throttle valve 16, auxiliary throttle control motor 22, etc. consitute primary anti-slip control means for lowering the rotating speed of the drive wheels 30, 32, while the hydraulic rear wheel brakes 38, 40 constitute auxiliary anti-slip control means for lowering the speed of the drive wheels. This arrangement permits reduction of the speed Vr of the drive wheels, while saving the energy of the engine 10 and minimizing the shortening of life expectancy of the friction members of the brakes 38, 40.

Figure 6:
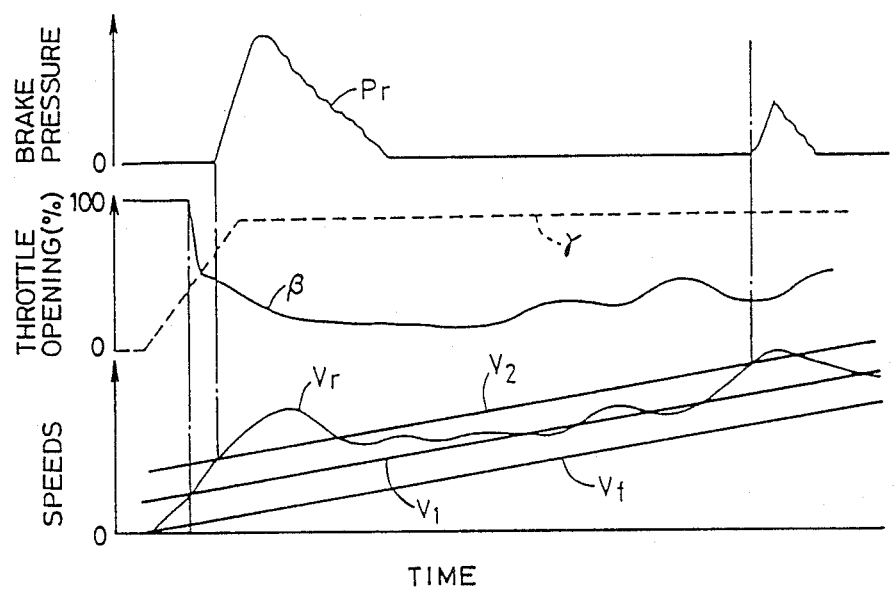
FIG. 6 is a graphical representation illustrating an example of an anti-slip control operation of the anti-slip control device.

As is apparent from FIG. 6, the auxiliary throttle valve 16 is rapidly rotated to its fully closed position as soon as the running speed Vf of the vehicle exceeds the first reference speed V1. After the opening $\beta$ of the auxiliary throttle valve 16 becomes equal to the opening $\gamma$ of the main throttle valve 14, the valve 16 is slowly rotated toward the fully closed position. The opening of the auxiliary throttle valve 16 is increased when the speed Vr of the rear wheels 30, 32 becomes lower than the first reference speed V1, and decreased when the speed Vr becomes higher than the first reference speed V1. Since this control operation is not directly concerned with the principle of the present invention, no further details are provided herein.

Referring back to the flow chart of FIG. 3, there will be described in detail a control operation of the hydraulic brake system for the rear drive wheels 30, 32.

While a specific key switch provided on the vehicle is held on, the computer of the control device 60 executes the brake control routine of FIG. 3 at a predetermined time interval, for example, every 5 msecs. In this brake control routine, step S1 is initially executed to determine whether the accelerator pedal 18 has been depressed, or not. If the pedal 18 has not been depressed, this means that the vehicle is not in an acceleration mode. In this case, a brake control cycle is completed with only step S2 being executed to turn on a "FIRST TIME" flag, and with the other steps being skipped.

When the accelerator pedal 18 is operated, step S1 is followed by step S3 wherein the CPU 72 calculates the vehicle speed Vf, speed Vr of the rear wheels 30, 32, and a rate of acceleration $\alpha r$ of the rear wheels. The vehicle speed Vf is calculated as an average speed of the left and right front wheels 26, 28, and the speed Vr and acceleration rate $\alpha r$ of the rear drive wheels 30, 32 are calculated based on the output signal of the rear wheel speed sensor 70.

The control flow then goes to step S4 to determine whether an "UPHILL" flag is on or not. If an affirmative decision (YES) is obtained in step S4, the control flow goes to steps S5 and S6. Since the "UPHILL" flag was turned off in an initializing routine implemented upon application of power to the control device 60, a negative decision (NO) is obtained in step S4 at this point of time. Therefore, steps S7 and S8 are executed. In step S7, the first and second reference speeds V1 and V2 are calculated by adding predetermined values, e.g., 3 km/h and 6 km/h, to the vehicle speed Vf calculated in step S3. In step S8, oe of a plurality of pressure control modes is selected based on the first and second reference speeds V1, V2, and the speed Vr and acceleration rate $\alpha r$ of the rear wheels 30, 32 calculated in step S3, and according to the flat-road control table shown in FIG. 5. Since the rear wheel speed Vr is lower than the first reference speed V1 and the accleration rate $\alpha r$ is almost zero immediately after the depression of the accelerator pedal 18, a fast pressure decrease mode (FD) is selected according to the flat-road control table of FIG. 5. Consequently, the solenoid-operated directional control valve 56 is held deenergized, while the solenoid-operated flow control valve 58 is energized with an electric current having a low duty cycle, whereby the auxiliary master cylinder 52 is held in communication with the reservoir 61, with no fluid pressure applied to the rear wheel brakes 38, 40.

In the next step S10, the CPU 72 determines whether the rear wheel speed Vr is being lowered or not. In an early period of the control operation initiated by the depression of the accelerator pedal 18, the speed Vr is not being lowered, and a negative decision is obtained in step S10. Therefore, the control flow goes to step S15, while skipping steps S11 through S14. In step S15, the CPU 72 determines whether the vehicle speed Vf calculated in step S3 exceeds a second predetermined value Vs2, e.g., 5 km/h, or not. Since a negative decision is obtained in step S15 in the early period of operation, the next step S16 is skipped, and one control cycle of the brake control routine is terminated.

As the above control cycle is repeatedly executed, the rear wheel speed Vr becomes higher than the second reference speed V2 as indicated in FIG. 6. At this point of time, the acceleration rate $\alpha r$ of the rear wheels 30, 32 is usually higher than a second predetermined reference G2. Accordingly, a fast pressure increase mode (FU) is selected in step S8, whereby, in step S9, the directional control valve 56 is switched to effect fluid communication between the auxiliary master cylinder 52 and the accumulator 54, and the flow control valve 58 is energized with an electric current having a comparatively low duty cycle. In consequence, the brake pressure in the rear wheel brakes 38, 40 is rapidly increased.

As a result, the rotating speed of the rear wheels 30, 32 is lowered, and the acceleration rate $\alpha r$ of the rear wheels eventually becomes lower than the second predetermined reference G2. Consequently, a slow pressure increase mode (SU) is selected in step S8. Accordingly, the duty cycle of the electric current applied to the flow control valve 58 is lowered in step S9, so that the rate of increase in the fluid pressure in the rear wheel brakes 38, 40 is lowered. When the acceleration rate c r thereafter becomes lower than a first predetermined reference G1 which is a negative value, a slow pressure decrease mode (SD) is selected in step S8, whereby the directional control valve 56 is deenergized and the flow control valve 58 is energized with an electric current having a comparatively high duty cycle, so that the fluid pressure in the rear wheel brakes 38, 40 is slowly decreased in step S9.

If the acceleration rate u r becomes a negative value, the rear wheel speed Vr begins to be lowered, whereby an affirmative decision (YES) is obtained in step S10. In the next step S11, the CPU 72 determines whether the "FIRST TIME" flag is on, or not. Since this flag was turned on in step S2 previously implemented, an affirmative decision is obtained in step S12, and the step is followed by step S12 in which the "FIRST TIME" flag is turned off. Then, in step S13, the CPU 72 determines whether the vehicle speed Vf is lower than a first predetermined speed Vs1, for example, 1 km/h. Usually, the vehicle speed Vf at this point of time exceeds 2 km/h where the vehicle is started on a level road, but the speed Vf is below this value (first predetermined value Vs1) where the vehicle is started on an uphill road to run up the slope. Therefore, it is possible to determine whether the road on which the vehicle has been started is an uphill road or not, by determining whether the vehicle speed Vf at this point of time exceeds the first predetermined value Vs1 or not. If an affirmative decision is obtained in step S13, the control flow goes to step S14 to turn on the "UPHILL" flag, which indicates that the brake pressure in the rear wheel brakes 38, 40 should be controlled in the uphill-road mode, according to the uphill-road control table of FIG. 4.

In the next control cycle of the brake control routine, an affirmative decision is obtained in step S4, and steps S5 and S6 are implemented. In step S5, the first and second reference speeds V1 and V2 are calculated by adding to the detected vehicle speed Vf suitable values, e.g., 1 km/h and 2 km/h, respectively, which are smaller than those added in the correspoinding step S7 in the flat-road mode. In step S6, one of a plurality of pressure control modes is selected according to the uphill-road control table indicated in FIG. 4. The uphill-road control table represents pressure regulating commands which are indicative of higher brake pressures, than the corresponding commands represented by the flat-road control table of FIG. 5. Namely, the first and second reference speeds V1 and V2 determined in step S5 in the uphill-road control mode are lower than those determined in the corresponding step S7 in the flat-road control mode, and the pressure control mode selected in step S6 permits higher brake pressures than the mode selected in the corresponding step S8. Accordingly, the slip ratio of the left and right rear drive wheels 30, 32 is controlled to be a lower value when the vehicle is started on an uphill road, than when the vehicle is started on a level road.

Figure 7:
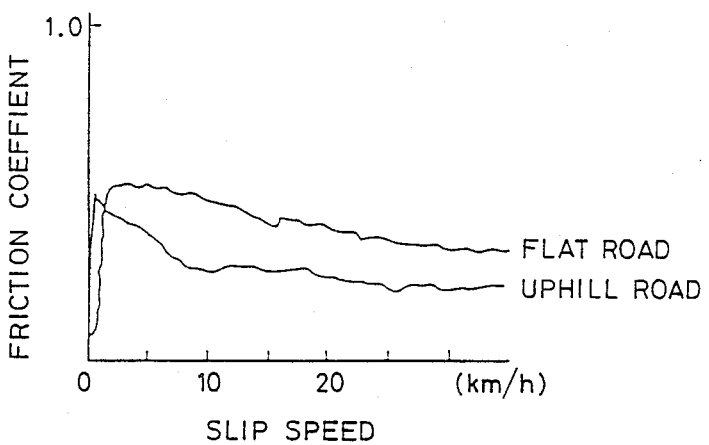
FIG. 7 is a graph for explaining the reason for controlling a siip ratio of the drive wheels to a lower value when the vehicle is on an uphill road, than on a flat or level road.

The graph in FIG. 7 shows a slip amount (slip speed km/h) of the rear drive wheels 30, 32 measured upon starting of the vehicle on a snow-covered level road and a snow-covered 6°-uphill road, in relation to a measured friction coefficient between the drive wheels and the road surfaces. It follows from the graph that the friction coefficient is smaller on the uphill road than on the level road, even if the slip amount is the same on the uphill and level roads. It is presumed that since the drive wheels of a vehicle more easily slip on the surface of an uphill road than on the surface of a level road, the uphill road surface tends to be more heavily polished than the level road surface. Therefore, in order to achieve a good start of the vehicle on the uphill road surface, the slip ratio of the drive wheels should be held at a lower value than on the level road surface, because of a comparatively lower friction coefficient on the uphill road surface than on the level road surface. For this reason, the first and second reference speeds V1 and V2 used in the uphill-road control mode should be lower than those used in the flat-road control mode, so that the slip speed of the drive wheels is maintained at a lower level when the vehicle is started on the uphill road.

Although the flat-road control table of FIG. 5 may be used to control the brake pressure for the drive wheels during starting of the vehicle on an uphill road, experiments proved better results in the case where the pressure control operation is effected according to the uphill-road control table of FIG. 4, which generally requires higher brake pressures to be applied to the rear brakes 38, 40 when the vehicle is started on the uphill road. In this sense, the use of the two different pressure control tables depending upon the road surface inclination according to the present invention is significant in controlling the start operations of the vehicle.

In step S11 implemented after steps S5 and S6 are executed in the last control cycle, a negative decision is obtained since the "FIRST TIME" flag was turned off in step S12 in the last control cycle. Consequently, steps S12 through S14 are skipped, and the "UPHILL" flag is held on, whereby the brake pressure for the rear wheel brakes 38, 40 is continuously controlled in the uphill-road mode, i.e., according to the uphill-road control table of FIG. 4.

During the brake pressure control in the uphill-road mode, the vehicle speed Vf is gradually increased and eventually exceeds the second predetermined value Vs2, whereby an affirmative decision (YES) is obtained in step S15. The control flow then goes to step S16 to turn off the "UPHILL" flag. Therefore, a negative decision (NO) is obtained in step S4 in the next control cycle of the brake pressure control routine, and thereafter steps S7 and S8 are implemented to control the brake pressure in the flat-road mode according to the control table of FIG. 5. This means that the flat-road control table is used after the vehicle started on the uphill road has been sufficiently accelerated, since the controlling the drive wheels so as to permit a higher slip ratio is required to assure better drivability of the vehicle after the vehicle speed Vf becomes higher than a certain higher level, i.e., second predetermined value Vs2.

As described above, the hydraulically operated rear wheel brakes 38, 40 are controlled in the uphill-road mode if the vehicle speed Vf is lower than the first predetermined value Vs1 when the rear wheel speed Vr begins to be lowered for the first time due to the activation of the anti-slip control device. Where the vehicle is started on a level road, the vehicle speed Vf is higher than the first predetermined value Vs1 when the speed Vr begins to be lowered for the first time, whereby the decision obtained in step S13 at this point of time is negative, and step S14 is not executed. In this case, therefore, the "UPHILL" flag is not turned on, and the decision in step S4 in the next control cycle is also negative. Thus, the brake pressure control operation is performed in the flat-road mode according to the control table of FIG. 5, from the beginning of the brake control routine.

It follows from the foregoing description of the present embodiment that the front wheel speed sensors 66, 68, and the portion of the computer of the control device 60 for executing step S3 of FIG. 3 consitute vehicle-speed detecting means for detecting the vehicle speed Vf, and that the portion of the computer for executing step S3 of FIG. 3 constitutes detecting means for detecting the rotating speed Vr of the rear drive wheels 30, 32. Further, the portion of the computer for executing steps S10 through S14 consitutes judging means for determining that the vehicle is on an uphill road. The portion of the computer for executing step S15 constitutes means for detecting that the vehicle speed Vf is lower than the predetermined threshold speed Vs2. The portion of the computer for executing steps S4, S5 and S7 constitutes means for determining a target speed of the drive wheels 30, 32. Furthermore, anti-slip control means for lowering the speed Vr of the drive wheels 30, 32 is constituted by the hydraulic brake system and engine output reducing means. The hydraulic brake system includes the portion of the computer for executing steps S6, S8 and S9, rear wheel brakes 38, 40, auxiliary master cylinder 52, accumulator 54, and solenoid-operated directional and flow control valves 56, 58. The engine output reducing means includes the auxiliary throttle valve 16, auxiliary throttle control motor 22, auxiliary throttle sensor 24, and the portion of the computer for controlling these components 16, 22, 24. The first predetermined value Vs1 is used as a threshold value with which the vehicle speed Vf is compared by the judging means.

In the present embodiment, the engine output reducing means functions as primary means for lowering the speed of the drive wheels, while the hydraulic brake system for the drive wheels functions as secondary or auxiliary means for lowering the drive wheel speed. However, it is possible that the hydraulic brake system functions as primary means for lowering the drive wheel speed, while the engine output reducing means functions as auxiliary means for lowering the drive wheel speed. Further, the engine output reducing means may be eliminated, so that the hydraulic brake system for the drive wheels solely consitutes the means for lowering the speed of the drive wheels. In any of the above cases, the principle of the present invention may be effectively practiced.

In the illustrated embodiment, the determination as to whether the vehicle is started on an uphill or level road is made based on the vehicle speed at the moment when the speed of the drive wheels begins to be lowered for the first time after an activation of the anti-slip control device due to excessive slip ratio of the drive wheels. However, the specific point of time or moment at which the determination is made may be a moment a predetermined time after the anti-slip control device is activated, as shown in the flow chart of FIG. 8, or alternatively a moment a predetermined time after the accelerator pedal 18 is depressed, as shown in the flow chart of FIG. 9.

Figure 8:
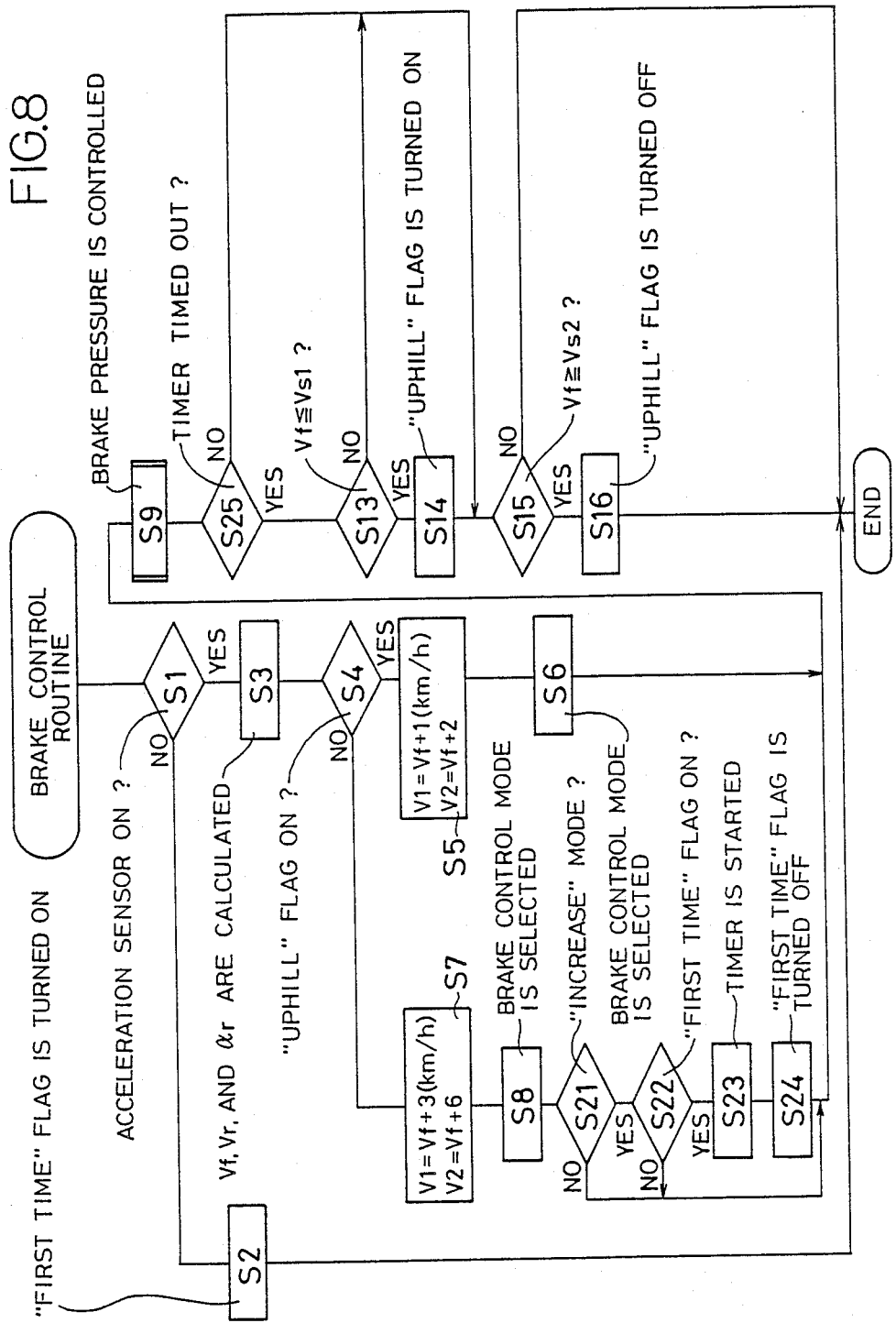
FIGS. 8 and 9 are flow charts corresponding to that of FIG. 3, showing modified embodiments of the present invention.

In the modified embodiment of FIG. 8, the activation of the anti-slip control device is detected in step S21 following step S8. That is, if a pressure increase mode is selected in step S8, an affirmative decision is obtained in step S21, and therefore step S22 is executed to determine whether the "FIRST TIME" flag is on or not. Since this flag was turned on in step S2 already executed, step S22 is followed by step S23 in which a timer is started. Then, step S24 is executed to turn off the "FIRST TIME" flag, and is followed by step S9 described above. Step S23 is provided to measure a predetermined time after the pressure increase mode is selected in step S8, i.e., after the anti-slip control device is activated. Step S9 is followed by step S25 to determine whether the predetermined time has lapsed, that is, whether the timer started in step S23 has been timed out, or not. Step S25 is followed by step S15 until an affirmative decision is obtained in step S25. In other words, when the predetermined time has lapsed after the pressure increase mode is selected to reduce the speed Vr of the drive wheels 30, 32, step S25 is followed by step S13 in which the determination as to the uphill and level roads is made, based on the current vehicle speed Vf and the threshold value Vs1.

Figure 9:
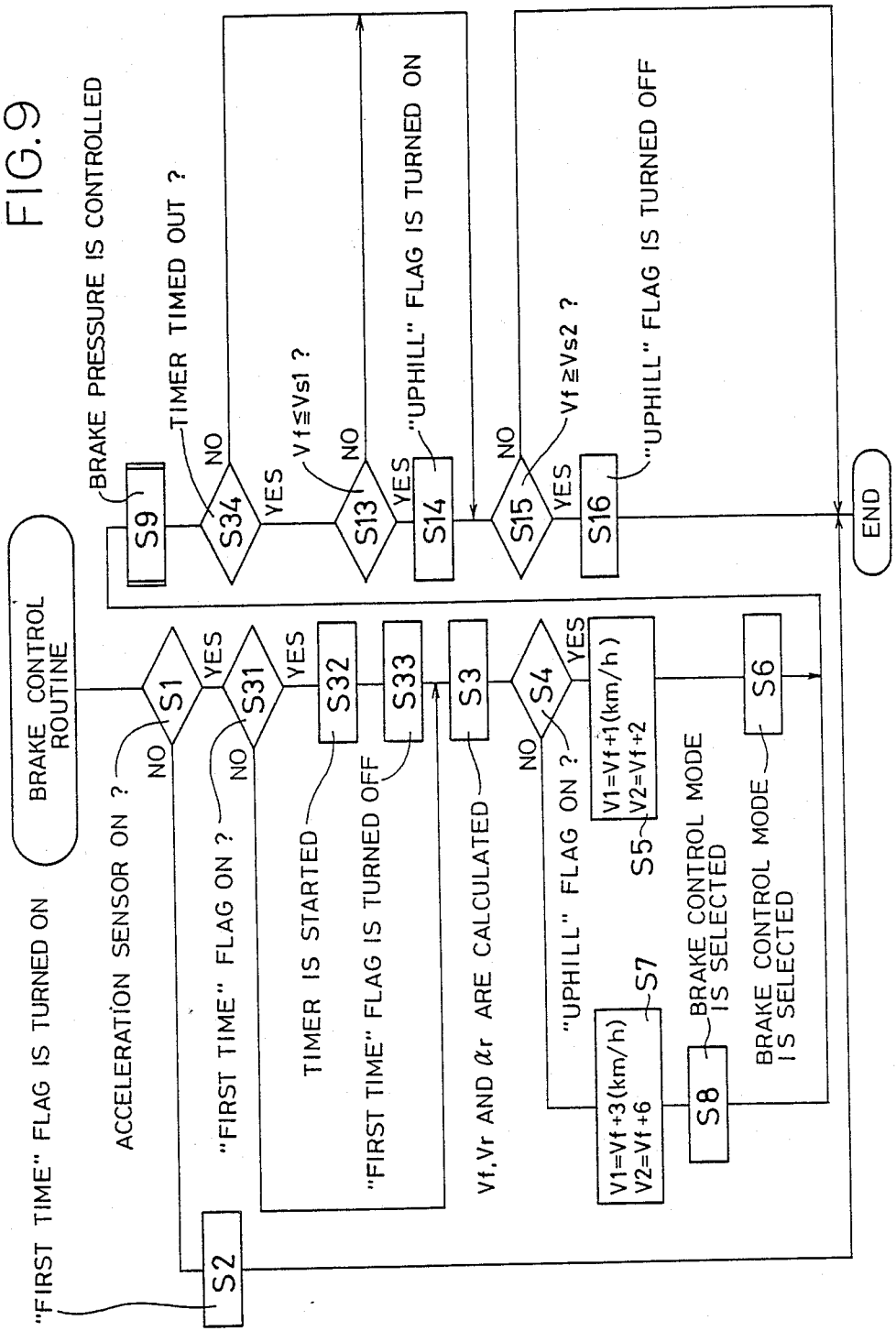

In the modified embodiment of FIG. 9, step S1 is followed by steps S31, S32 and S33 similar to steps S22–S24 of FIG. 8, if the accelerator pedal 18 is operated. Namely, the timer is started in step S32 to measure a time lapse after the depressing action on the pedal 18. The time lapse is checked in step S34 following step S9. Step S34 which corresponds to step S25 of FIG. 8 is followed by step S13 when the predetermined time has elapsed after the accelerator pedal 18 is depressed.

In the illustrated embodiments of FIGS. 3, 8 and 9 wherein the determination as to whether the vehicle is on an uphill road is made based on the vehicle speed at a suitable point of time during starting of the vehicle, it is possible that a level road may be erroneously judged as an uphill road, if the surface of the level road has an extremely low friction coefficient. Even in this case, however, controlling the hydraulic brake in the uphill-road mode according to this erroneous determination is desirable for smooth starting of the vehicle, since the low friction coefficient of such a level road requires an accordingly small slip ratio of the drive wheels, as in the case where the vehicle is started on an uphill road.

Figure 10:
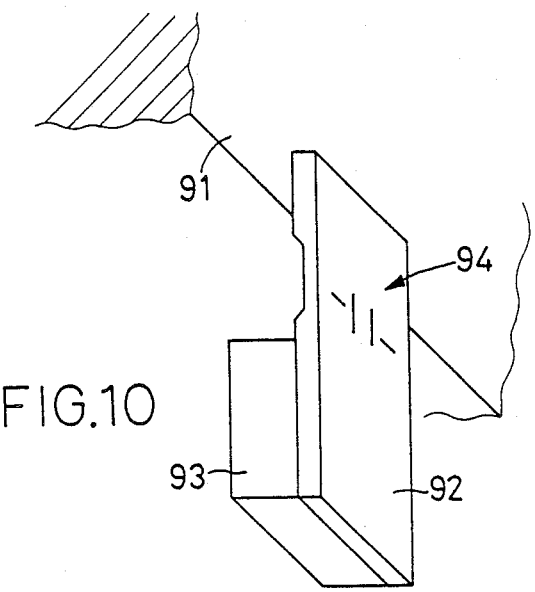
FIGS. 10 and 11 are views showing a further modified embodiment of the present invention.
Figure 11:
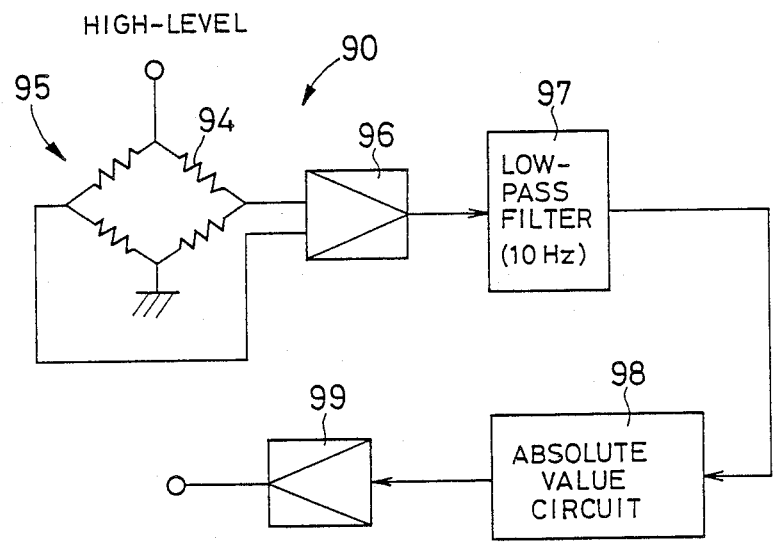

Referring to FIGS. 10-12, there is shown a further modified embodiment of the present invention wherein an inclination detecting device 90 (also indicated in FIG. 2 in broken line) is used to determine whether the vehicle is on an uphill road. This detecting device 90 includes a detecting head as shown in FIG. 10, and a processing circuit as shown in FIG. 11. The detecting head has a base 91 fixed to the body of the vehicle, and a silicon wafer 92 secured at its one end to the base 91, such that the other or free end projects from the base 91. The silicon wafer 92 is oriented such that its major opposite surfaces face in the running direction of the vehicle. The silicon wafer 92 carries at its free end a weight 93 fixed thereto, and has a diffusion resistor 94 formed on a part of its surface adjacent to the fixed end. The detecting head is adapted such that the silicon wafer 92 is deformed or flexed due to gravity of the weight 93 if the vehicle is inclined in the running direction, and due to an inertia of the weight 93 when the vehicle is accelerated or decelerated. As a result, the resistance of the diffusion resistor 94 is changed. The processing iircuit includes a bridge 53 having the diffusion resistor 94 as on of its four arms, and further includes an amplifier 96, a low-pass filter 97, an absolute-value circuit 98, and an amplifier 99, in order to process output voltages of the bridge 94. The amplifier 99 provides an output voltage which is received by the control device 60 (FIG. 3). This output voltage is proportional to the amount of deformation of the silicon wafer 92. In other words, the output of the amplifier represents a tentative angle of inclinaticn of the vehicle in the running direction, which tentative angle includes a component corresponding to an acceleration of the vehicle in the running direction. Therefore, a true angle of inclination ($\theta$) of the vehicle is obtained by substrating or excluding the component corresponding to the vehicle acceleration, from the tentative angle of inclination detected by the inclination detecting device 90.

In the present embodiment, a brake control routine is carried out according to the flow chart of FIG. 12, wherein the same step numbers as used in FIG. 3 are used to identify the corresponding steps. In the flow chart of FIG. 12, step S1 is followed by step S41 in which the control device 60 calculates the vehicle speed Vf (speed of the front wheels 26, 28), acceleration rate $\alpha f$ of the front wheels, speed Vr of the rear drive wheels 30, 32, and acceleration rate $\alpha r$ of the rear drive wheels.

In the first control cycle of the present brake control routine wherein a negative decision is obtained in step S4, a pressure control mode is selected in step S8 according to the flat-road control table of FIG. 5, and the corresponding brake control operation is performed in step S9. Then, the control flow goes to step S42 in which the control device 60 receives the output of the amplifier 99 of the inclination detecting device 90. Then, in the next step S43, the true angle ($\theta$) of inclination of the vehicle is calculated, based on the tentative angle of inclination represented by the received output of the amplifier 99, and on the acceleration rate $\alpha f$ of the vehicle (front wheels). Step S43 is followed by step S44 to determine whether the true inclination angle $\theta$ is equal to or larger than a predetermined threshold value $\theta s$. If a negative decision is obtained, the control cycle is terminated after step S46 is executed to turn off the "UPHILL" flag. If an affirmative decision is obtained in step S44, the control flow goes to step S15 (as described above with respect to the first embodiment) to determine whether the vehicle speed Vf is equal to or higher than the predetermined value Vs2. If the vehicle speed Vf is equal to or higher than the value Vs2, the "UPHILL" flag is turned off in step S45. If the vehicle speed Vf is lower than the value Vs2, step S46 is executed to turn on the "UPHILL" flag. In this case, therefore, step S4 is followed by step S5 in the next control cycle, whereby a prssure control mode is selected in step S6 according to the uphill-road control table of FIG. 4. Thus, the present embodiment is adapted such that the flat-road control table and the uphill-road control table are selected depending upon the inclination angle of the vehicle in the rrunning direction which is calculated in step S43 based on the output of the inclination detecting device 90 and the calculated vehicle acceleration rate $\alpha f$.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the scope of the invention defined in the following claims.

What is claimed is:

1. An anti-slip control device for a drive wheel of a motor vehicle, comprising:

vehicle-speed detecting means for detecting a running speed of the vehicle;

drive-wheel speed detecting means for detecting a rotating speed of the drive wheel;

target-speed determining means for determining a target speed of the drive wheel in an uphill road mode and a flat road mode based on said running speed of the vehicle and said rotating speed of the drive wheel which are detected by said vehicle-speed detecting means and said drive-wheel speed detecting means, respectively;

anti-slip control means for lowering the rotating speed of the drive wheel such that said rotating speed substantially coincides with the determined target speed of the drive wheel;

uphill-road determining means for determining whether the vehicle is on an uphill road;

low-speed detecting means for detecting that the running speed of the vehicle detected by said vehicle-speed detecting means is lower than a first threshold value; and said target speed determining means determining said target speed in an uphill-road mode when said uphill-road determining means determines that the vehicle is on an uphill road, and when said low-speed detecting means detects that the detected running speed of the vehicle is lower than said first threshold value, said target speed determined in the uphill road mode being less than said target speed determined in the flat road mode.

2. An anti-slip control device according to claim 1, wherein said uphill-road determining means comprises timing detecting means for detecting a specific point of time during a starting period of the vehicle, and judging means for comparing the running speed of the vehicle detected at said specific point of time by said vehicle-speed detecting means with a second threshold value lower than said first threshold value, said judging means determining that the vehicle is on an uphill road when said detected running speed is lower than said second threshold value.

3. An anti-slip control device according to claim 2, wherein said timing detecting means detects a first point of time when the rotating speed of said drive wheel begins to be lowered by an operation of the anti-slip control device.

4. An anti-slip control device according to claim 2, wherein said timing detecting means detects a predetermined time lapse after commencement of an operation of the anti-slip control device.

5. An anti-slip control device according to claim 1, wherein said uphill-road determining means comprises:
an inclination detecting device for detecting a tentative angle of inclination of the vehicle in a running direction thereof, said tentative angle including a component corresponding an acceleration of the vehicle in said running direction;
acceleration detecting means for detecting said acceleration of the vehicle;
means for determining a true angle of inclination of the vehicle, by subtracting said component corresponding to the acceleration detected by said acceleration detecting means from said tentative angle detected by said inclination detecting device; and
judging means for determining that the vehicle is on an uphill road, if the determined true angle of inclination is greater than a predetermined value.

6. An anti-slip control device according to claim 1, wherein said target speed determining means determines said target speed in said flat-road mode by adding a first predetermined value to the running speed of the vehicle detected by said vehicle-speed detecting means, and determines said target speed in said uphill-road mode by adding a second predetermined value to said detected running speed, said second predetermined value being smaller than said first predetermined value.

7. An anti-slip control device according to claim 1, wherein said anti-slip control means comprises a hydraulically operated brake for applying a brake to said drive wheel, and a pressure control device for electrically regulating a brake pressure to be applied to said brake, said pressure control device controlling said brake pressure to a first level if said uphill-road determining means determines that the vehicle is on an uphill road and if said low-speed detecting means detects that the detected running speed of the vehicle is lower than said first threshold value, said pressure control device controlling said brake pressure to a second level in other conditions, said first level being higher than said second level.

8. An anti-slip control device according to claim 7, wherein said pressure control device stores a plurality of uphill-road pressure regulation commands used in said uphill-road mode, and a plurality of flat-road pressure regulating commands used in said flat-road mode, each of said plurality of uphill-road and said flat-road pressure regulating commands corresponding to a plurality of combinations each of which consists of a corresponding one of different ranges of the rotating speed of said drive wheel and a corresponding one of different ranges of an acceleration of said drive wheel, said plurality of pressure regulating commands establishing a plurality of pressure control modes in which said brake pressure is increased or decreased, each of said uphill road pressure regulating commands producing said first level higher than said second level which is produced by the corresponding one of said flat road pressure regulating commands.

9. An anti-slip control device according to claim 1, wherein said vehicle-speed detecting means determines said running speed of the vehicle, based on a rotating speed of an idler wheel of the vehicle.

10. An anti-slip control device according to claim 1, wherein said anti-slip control means comprises means for reducing an output of a drive source to drive said drive wheel.

* * * * *